United States Patent
Kadel et al.

(10) Patent No.: US 11,226,810 B1
(45) Date of Patent: Jan. 18, 2022

(54) METHOD FOR PROVIDING INFORMATION BASED ON EXPECTED RESULT VALUE AND COMPUTING DEVICE USING THE SAME

(71) Applicant: Coupang Corp., Seoul (KR)

(72) Inventors: Prakash Kadel, Seoul (KR); Ku Kang, Seoul (KR); Seong Wook Ahn, Seoul (KR); Jung Joon Park, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/171,775

(22) Filed: Feb. 9, 2021

(30) Foreign Application Priority Data

Dec. 29, 2020 (KR) ........................ 10-2020-0186235

(51) Int. Cl.
*G06F 8/65* (2018.01)
*G06F 8/71* (2018.01)
*G06F 9/54* (2006.01)
*G06F 9/50* (2006.01)

(52) U.S. Cl.
CPC .................. *G06F 8/65* (2013.01); *G06F 8/71* (2013.01); *G06F 9/5072* (2013.01); *G06F 9/546* (2013.01); *G06F 9/547* (2013.01)

(58) Field of Classification Search
CPC .... G06F 8/65–71; G06F 9/5072; G06F 9/546; G06F 9/547
USPC ................................ 717/168–174; 709/203
See application file for complete search history.

(56) References Cited

U.S. PATENT DOCUMENTS

| | | | | |
|---|---|---|---|---|
| 4,558,413 A | * | 12/1985 | Schmidt ................... | G06F 8/71 707/695 |
| 5,802,528 A | * | 9/1998 | Oki ......................... | G06F 16/27 |
| 6,236,993 B1 | * | 5/2001 | Fanberg .................... | G06F 8/71 707/690 |
| 6,510,402 B1 | * | 1/2003 | Logan ................. | G06F 11/3696 702/186 |
| 6,536,037 B1 | * | 3/2003 | Guheen ..................... | G06F 8/71 703/2 |

(Continued)

FOREIGN PATENT DOCUMENTS

| | | |
|---|---|---|
| JP | 2003-022196 A | 1/2003 |
| JP | 2009-140155 A | 6/2009 |

(Continued)

OTHER PUBLICATIONS

Zhou et al., "Planning for Code Buffer Management in Distributed Virtual Execution Environments", ACM, pp. 100-109 (Year: 2005).*

(Continued)

*Primary Examiner* — Anil Khatri
(74) *Attorney, Agent, or Firm* — Knobbe Martens Olson & Bear LLP

(57) ABSTRACT

According to various example embodiments, a method of providing information by a computing device may include checking an input information set, receiving a first result information set corresponding to the input information set (Continued)

from a first server, receiving a second result information set corresponding to the input information set from a second server, and providing a third result information set including information on or regarding a difference between the first result information set and the second result information set. Various other example embodiments may be possible.

16 Claims, 10 Drawing Sheets

(56) References Cited

U.S. PATENT DOCUMENTS

| | | | | |
|---|---|---|---|---|
| 7,131,112 | B1* | 10/2006 | Bartz | G06F 8/71 717/122 |
| 7,353,510 | B2* | 4/2008 | Noirot-Nerin | G06F 9/44505 717/169 |
| 7,437,712 | B1* | 10/2008 | Brown | G06F 8/71 717/121 |
| 8,443,354 | B1* | 5/2013 | Satish | G06F 9/44536 717/156 |
| 8,572,552 | B2* | 10/2013 | Kennaley | G06Q 10/1093 717/104 |
| 9,003,388 | B2* | 4/2015 | Han | G06F 9/4401 717/170 |
| 9,176,728 | B1* | 11/2015 | Dixit | H04L 67/10 |
| 9,218,176 | B1* | 12/2015 | Alberti | G06F 8/61 |
| 10,521,272 | B1* | 12/2019 | Moniz | G06F 9/4843 |
| 10,657,023 | B1* | 5/2020 | Willson | G06F 8/77 |
| 10,873,618 | B1* | 12/2020 | Mittal | H04L 67/02 |
| 11,126,543 | B2* | 9/2021 | Ellis | G06F 11/3688 |
| 2006/0075303 | A1 | 4/2006 | Ulrich et al. | |
| 2014/0229923 | A1 | 8/2014 | Sennewald et al. | |
| 2018/0349066 | A1 | 12/2018 | Nakamura | |

FOREIGN PATENT DOCUMENTS

| | | |
|---|---|---|
| JP | 2013-105358 A | 5/2013 |
| JP | 2014-010581 A | 1/2014 |
| JP | 2017-107265 A | 6/2017 |
| JP | 2018-205796 A | 12/2018 |
| KR | 10-2005-0074221 A | 7/2005 |
| KR | 10-2006-0050387 A | 5/2006 |
| KR | 10-2014-0102113 A | 8/2014 |

OTHER PUBLICATIONS

Nahabedian, "Dynamic Update of Business Process Management", IEEE, pp. 413-416 (Year: 2017).*
Buisson et al., "Introspecting continuations in order to update active code", ACM, pp. 1-5 (Year: 2008).*
Piotrowski, "Automatic Installation of Software-based Fault Tolerance Algorithms in Programs Generated by GCC Compiler", IEEE, pp. 101-105 (Year: 2010).*
Larsen et al, "SoK: Automated Software Diversity", IEEE, pp. 276-291 (Year: 2014).*
Fraser et al., "EvoSuite: Automatic Test Suite Generation for Object-Oriented Software", ACM, pp. 416-419 (Year: 2011).*
Inoue et al, "Ranking Significance of Software Components Based on Use Relations", IEEE, pp. 213-225 (Year: 2005).*
Turhan et al., "Metamodeling of Reference Software Architecture and Automatic Code Generation", ACM, pp. 1-7 (Year: 2016).*

* cited by examiner

FIG. 10

| | | 1021   1020 | 1031   1030 | 1040   1041 | | | |
|---|---|---|---|---|---|---|---|
| | | Code name | Code description | Administrator name | | | |
| 1 | ☐ | Code 1 | Description 1 | Administrator 1 | Correct | Download | Delete |
| 2 | ☐ | Code 2 | Description 2 | Administrator 2 | Correct | Download | Delete |
| 3 | ☐ | Code 3 | Description 3 | Administrator 3 | Correct | Download | Delete |

1012 1013 1011   1023 1022   1033   1032   1043   1042

1010

METHOD FOR PROVIDING INFORMATION BASED ON EXPECTED RESULT VALUE AND COMPUTING DEVICE USING THE SAME

BACKGROUND

Technical Field

Various example embodiments of the present disclosure relate to a method for providing information based on an expected result value and a computing device using the same.

Description of the Related Art

Search results for various items may be derived from a work code of an administrator. As an administrator quickly introduces a work code to be newly applied into an actual service server to achieve automation, consumers and users may quickly access update situations.

A physical distribution management system may include a management system for selling various items. For example, the physical distribution management system may include various types of data related to an item name, an item price, an item image, a delivery type of an item, promotion information according to an item and time, attributes of an item, a real-time inventory of an item, a distribution center where an item is located, real-time delivery information regarding an item, compensation for an item, or the like which may be included in data (for example, basic data of an item) related to an item on sale.

For example, the physical distribution management system may need to quickly update the quantity, location, order status, and the like of inventory in real time. Such a physical distribution management system may require a method for providing information based on an expected result value that can be used to check whether a work code of an administrator will be correctly applied, and a computing device using the same.

SUMMARY

Technical Goals

According to the management of various items and the operation of the system, it may be necessary to check whether the result values of the work codes of the administrators are derived as the desired result values. In the case of generating a new work code, when the generated code is immediately introduced into the service server, unexpected result values may be output. Since the physical distribution management system may require the quick processing, it may be necessary to check whether the physical distribution management system can operate without any problems even if a new work code is applied.

The present disclosure is directed to providing a method of providing information through which it can be checked whether an intended result value is output by testing a change and input of a work code of an administrator before the change and input of the work code of the administrator are applied to an actual service server, and a computing device using the same.

Technical Solutions

According to an aspect of the present disclosure, there is provided a method of providing information by a computing device, including checking an input information set, receiving a first result information set corresponding to the input information set from a first server, receiving a second result information set corresponding to the input information set from a second server, and providing a third result information set including information on or regarding a difference between the first result information set and the second result information set.

According to another aspect of the present disclosure, there is also provided a computing device, including a transceiver for receiving and transmitting data, a database for storing data, and a processor, in which the processor may check an input information set received through the transceiver, receive a first result information set corresponding to the input information set from a first server, receive a second result information set corresponding to the input information set from a second server, and provide a third result information set including information on a difference between the first result information set and the second result information set.

Effects

A method for providing information according to various example embodiments may include providing the comparison result of the intended result values by testing the change and input of the work code of the administrator while reflecting the update situations of the physical distribution management system, thereby reducing errors when applying the change and input of the work code of the administrator to the actual server.

A computing device according to various example embodiments may compare the result value of the same input value in the actual server with the result value in the test server, thereby preventing errors and preventing the overload of work by the efficient physical distribution management.

BRIEF DESCRIPTION OF THE DRAWINGS

FIG. 10 is an exemplary diagram of the third result information set including information on or regarding a web user interface (UI) that displays information on a code according to various example embodiments of the present disclosure.

DETAILED DESCRIPTION

Figure 1:
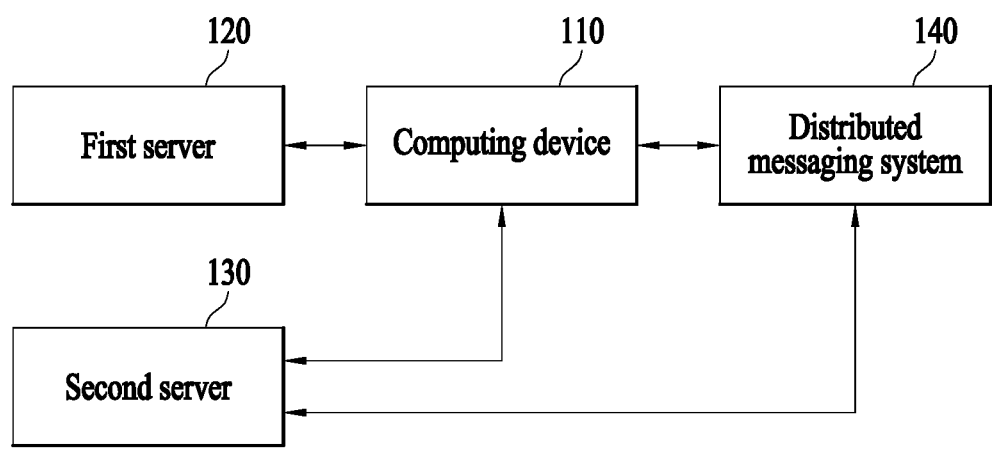
FIG. 1 is a schematic block configuration diagram illustrating performance of a method of providing information according to various example embodiments of the present disclosure.

General terms that are currently widely used are selected as terms used in example embodiments in consideration of functions in the present disclosure but may be changed depending on the intention of those skilled in the art or a judicial precedent, the emergence of a new technique, and the like. In addition, in specific cases, there may be terms arbitrarily chosen by the applicant. In this case, the meaning of such a term will be described in detail in a corresponding description portion. Therefore, the terms used in the present disclosure should be defined on the basis of the meanings of the terms and the content throughout the present disclosure rather than the simple names of the terms.

Throughout the specification, unless otherwise specified, "including" any component means that other components may be further included rather than excluding other components. In addition, the terms "unit," "module," and the like, described in the specification refer to a processing unit of at least one function or operation and may be implemented by hardware or software or a combination of hardware and software.

The expression "at least one of a, b, and c" described throughout the specification may include "a alone," "b alone," "c alone," "a and b," "a and c," "b and c," or "all of a, b, and c."

A "terminal" described below may be implemented as a computer or a portable terminal that may access a server or other terminals through a network. Here, computers may include, for example, a notebook, a desktop, a laptop, and the like, which are equipped with a web browser, and portable terminals are wireless communication devices that ensure portability and mobility, and may include, for example, International Mobile Telecommunications (IMT), code division multiple access (CDMA), W-code division multiple access (W-CDMA), and Long Term Evolution (LTE) terminals, and all kinds of handheld-based wireless communication devices, such as a smartphone and a tablet PC.

In the following description, example embodiments of the present disclosure will be described in detail with reference to the drawings so that those skilled in the art can easily carry out the present disclosure. The present disclosure may be embodied in many different forms and is not limited to the example embodiments described herein.

Hereinafter, example embodiments of the present disclosure will be described with reference to the drawings.

In describing the example embodiments, description of technical content that is well known in the technical field to which the present disclosure pertains and is not directly related to the present disclosure will be omitted. This is to more clearly convey the gist of the present disclosure without ambiguity by omitting unnecessary explanations.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods of accomplishing them will become apparent from example embodiments to be described in detail below with reference to the accompanying drawings. However, the present disclosure is not limited to the example embodiments to be described below, but may be implemented in various different forms, these example embodiments will be provided only in order to make the present disclosure complete and allow those skilled in the art to completely recognize the scope of the present disclosure, and the present disclosure will be defined by the scope of the claims. Throughout the specification, like reference numerals denote like components.

In this case, it will be appreciated that each block of a processing flowchart and combinations of the flowcharts may be executed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in the block(s) of the flowchart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including instruction means performing the functions described in the block(s) of the flowchart. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses, may also provide operations for performing the functions described in the block(s) of the flowchart.

In addition, each block may indicate some modules, segments, or codes including one or more executable instructions for executing a specific logical function(s). Further, it is to be noted that functions mentioned in the blocks occur regardless of a sequence in some alternative example embodiments. For example, two blocks that are shown consecutively can in fact be simultaneously performed or can be performed in a reverse sequence depending on corresponding functions.

FIG. 1 is a schematic block configuration diagram illustrating performance of a method of providing information according to various example embodiments of the present disclosure.

According to various example embodiments, the method of providing information may be performed by a computing device 110, a first server 120, a second server 130, and a distributed messaging system 140.

The computing device 110 is a device in which a system for processing various computations is built and may perform, for example, computation processing through a language including a processing instruction of an administrator, computation processing for comparison by theme by receiving a result information set, or computation in which a rule is applied to at least a part of a changed input information set.

The computing device 110 may include a plurality of computer systems or computer software implemented as a network server and provide various types of information according to a web page or a control tool. For example, the computing device 110 may be a computer system and computer software that may communicate with other network servers through a network, be connected to an external device to receive an operation performance request, and perform an operation on the requested operation to provide the performance result.

The first server 120 may be connected to the computing device 110 through a network to transmit and receive data thereto and therefrom. For example, the first server 120 may be a server in which service information on or regarding products is stored and processed. The service information on products is a list of products, quantities of products, warehousing times of products, locations of distribution centers where products are located, sellers of products, categories of products, sales rankings of products, sales volumes of products, whether products are accompanied by advertisements, information on or regarding statuses of products, or the like. The first server 120 may include a production build and transmit a result information set (for example, a first result information set) corresponding to an input information set to the computing device 110. The first server may be a server on which a reference code runs.

The second server 130 may be connected to the computing device 110 through the network to transmit and receive data. The second server 130 may be a server on which a development code corresponding to the reference code to be provided from the service server runs. For example, the second server 130 may be a server that stores and processes information related to an operation to check an expected result value through the computing device 110. The information related to the operation may include an operation of restricting some themes when products are listed, an operation of changing some themes when names of products are changed, an operation of deleting data in a cache, and the like, and may include the development code to be applied to the service server by the administrator. The second server 130 may include a stage build and transmit the result information set (for example, a second result information set) corresponding to the input information set to the computing device 110. The second server may be a server on which the development code runs.

The distributed messaging system 140 may be connected to the computing device 110 and the second server 130 through the network to transmit and receive data thereto and therefrom. For example, the distributed messaging system 140 may receive a deployment message from the second server 130. The distributed messaging system 140 may transmit a request message for providing the third result information set to the computing device 110. The distributed messaging system 140 may request computation processing for testing the computing device 110 based on a received deployment message. For example, the distributed messaging system 140 may transmit a test initiation message for the computing device 110 to provide the third set of result information.

Figure 2:
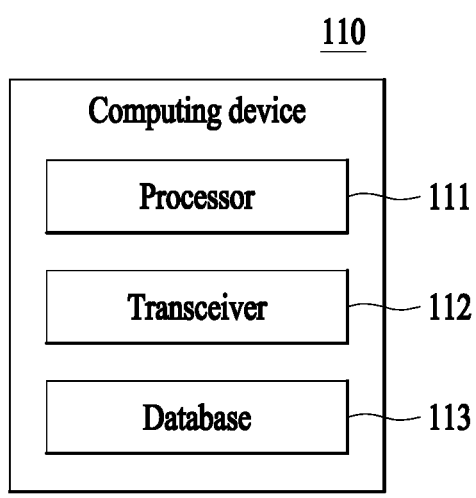
FIG. 2 is a block diagram illustrating components of a computing device according to various example embodiments of the present disclosure.

FIG. 2 is a block diagram illustrating components of the computing device according to various example embodiments of the present disclosure.

Referring to FIG. 2, the computing device 110 may include at least one of a processor 111, a transceiver 112, and a database 113.

The processor 111 may process a series of operations for performing the method of providing information according to various example embodiments of the present disclosure. The processor 111 may control other components of the computing device 110.

The processor 111 may check the input information set for testing. For example, the processor 111 may receive and check the input information set through a program by a control system and/or an administrator tool. As another example, the processor 111 may receive the input information set through the transceiver 112, and the input information set may be transmitted to the computing device 110 through the distributed messaging system.

The processor 111 may receive the first result information set corresponding to the input information set from the first server (for example, the first server 120 in FIG. 1). For example, the processor 111 may receive the first result information set through the transceiver 112. The first result information set may be a result value (or an output value) corresponding to the input information set and may be referred to as an intended result value, a desired result value, or the like as an expected result value. The first result information set may include output values for each code corresponding to the input information set to be tested through the computing device 110. As another example, the first result information set may vary according to the operation and combination of the reference codes applied to the first server. The first result information set may vary depending on a time when a code is applied, a combination of applied codes, and the like.

The processor 111 may receive the second result information set corresponding to the input information set from the second server (for example, the second server 130 in FIG. 1). For example, the processor 111 may receive the second result information set through the transceiver 112. The second result information set may be a result value (or an output value) corresponding to the input information set and may be referred to as a tested result value, a test value, or the like as a test result value. The second result information set may include output values for each code corresponding to the input information set to be tested through the computing device 110. As another example, the second result information set may vary according to the operation and combination of the development codes applied to the second server. The second result information set may vary depending on a time when a code is applied, a combination of applied codes, and the like.

The processor 111 may provide a third result information set including information on or regarding a difference between the first result information set and the second result information set. The first result information set may include the output values for each code corresponding to the input information set. The second result information set may include the output values for each code corresponding to the input information set. For example, the processor 111 may compute the difference in the output values for each code running on the first server and the second server. Output values for each reference code running on the first server may be included in the first result information set, and output values for each development code running on the second server may be included in the second result information set. The difference for each code of the first result information set and the second result information set may be the difference in the output values for each code. For example, the difference in the output values for each code running on the first server and the second server may be the difference between the first result information set and the second result information set. The processor 111 may determine whether there is the difference for each code of the first result information set and the second result information set corresponding to the input information set.

The processor 111 may provide the third result information set that includes information on or regarding whether there is a difference in the output values for each code running on the first server and the second server. For example, the processor 111 may provide the information on whether there is a difference in the output values of the first result information set obtained by applying the reference code to the same input information set and the second result information set obtained by applying the development code.

The third result information set may include information on or regarding a web user interface (UI) on which names of the codes of the first server and the second server, a description of the codes, and a name of the administrator who configures the codes are displayed. For example, the third result information set may include information that displays the names of the codes that are applied or that will be applied to the first result information set and the second result information set, the description of the codes, and the name of the administrator who configures the codes through the web UI.

The third result information set may include information with which the difference in the output values that exist for each code can be checked. The processor 111 may receive a selection input for checking the difference in the output values that exist for each code. For example, providing the third result information set by the processor 111 may include comparison information on or regarding the difference between the selected portions of the output values of the code in response to the selection input for checking the difference, based on the first result information set and the second result information. The comparison information may include information indicating at least a part of the first result information set, at least a part of the second result information set, and a portion where the difference exists.

The processor 111 may provide the third result information set corresponding to the changed development code. For example, the second server may receive the changed development code reflecting the input status of the administrator through the control system and/or the administrator tool. When it is checked that the difference between the first result information set and the second result information set is large based on the provided third result information set, the administrator who configures the code may change the development code applied to the second server to reduce the checked difference. The reason for changing the development code may be to reduce or eliminate the difference in the output values included in the first result information set and the second result information set. The processor 111 may provide the third result information set corresponding to the changed development code by using the changed second result information set output by applying the changed development code to the existing input information set. The third result information set corresponding to the changed development code may include the information on or regarding the difference between the first result information set and the changed second result information set corresponding to the input information set according to the changed development code. After the development code is changed, the processor 111 may again test whether there is a difference between the result information sets corresponding to the same input information set.

The processor 111 may acquire configuration information (for example, an ignorance rule) that excludes, from the information on the difference, the portion in which the third result information set is changed regardless of the change in the development code. For example, the processor 111 may acquire configuration information that configures a comparison target portion of the first result information set and the second result information set. The third result information set may be displayed based on the configuration information. For example, the configuration information may be applied to exclude, from the information on the difference, the portion of the output values included in the first result information set and the second result information set that is changed regardless of the change in the development code. The administrator may input the configuration information to exclude the portion changed regardless of the change in the development code from the information on the difference included in the third result information set. As another example, the configuration information may be applied to arrange the first result information set and the second result information set before comparing the first result information set and the second result information set. In order to compare the first result information set and the second result information set, it may be necessary to set the first result information set and the second result information set in the order in which the output values for each code are mapped. As another example, the configuration information may be applied to compare output values having the same value in a specific portion of the first result information set and the second result information set. The processor may apply the configuration information to remove output values that are not identical in the specific portion from the first result information set and the second result information set, thereby providing the third result information set more quickly.

The processor 111 may transmit a request message for providing the third result information set through the transceiver through the distributed messaging system. For example, the processor 111 may test whether there are errors in a service code for providing a service through a test server before applying a service code for providing services in a service server. The processor 111 may receive the first result information set and the second result information set in response to the request message.

When the administrator inputs selection information for selecting at least a part of the input information set, the processor 111 may acquire the selection information. As the selection information is acquired, the processor 111 may transmit a request message for requesting a test to the first server and the second server in order to perform the test. The processor 111 may check the input information set based on the selection information.

In addition, the processor 111 may perform various functions related to the method of providing information according to various example embodiments of the present disclosure.

The transceiver 112 may perform a function of transmitting information stored in the database 113 of the computing device 110 or information processed by the processor 111 to another device or receiving information from another device to the computing device 110. For example, the transceiver 112 may receive the result information set (for example, the first result information set and the second result information set) from the first server and/or the second server. As another example, the transceiver 112 may receive information from the distributed messaging system (for example, the distributed messaging system 140 in FIG. 1) or the development control system or transmit information to the distributed messaging system or the development control system.

The database 113 has a data structure implemented in a predetermined storage space of the computing device 110, and thus functions such as storing, searching, deleting, editing, or adding data may be freely performed. For example, the database 113 may include fields or elements for processing functions such as storing, searching, deleting, editing, or adding data. The database 113 may store data related to performing the method of providing information by the computing device 110. For example, the database 113 may store instructions or data for an execution operation of the processor 111.

Figure 3:
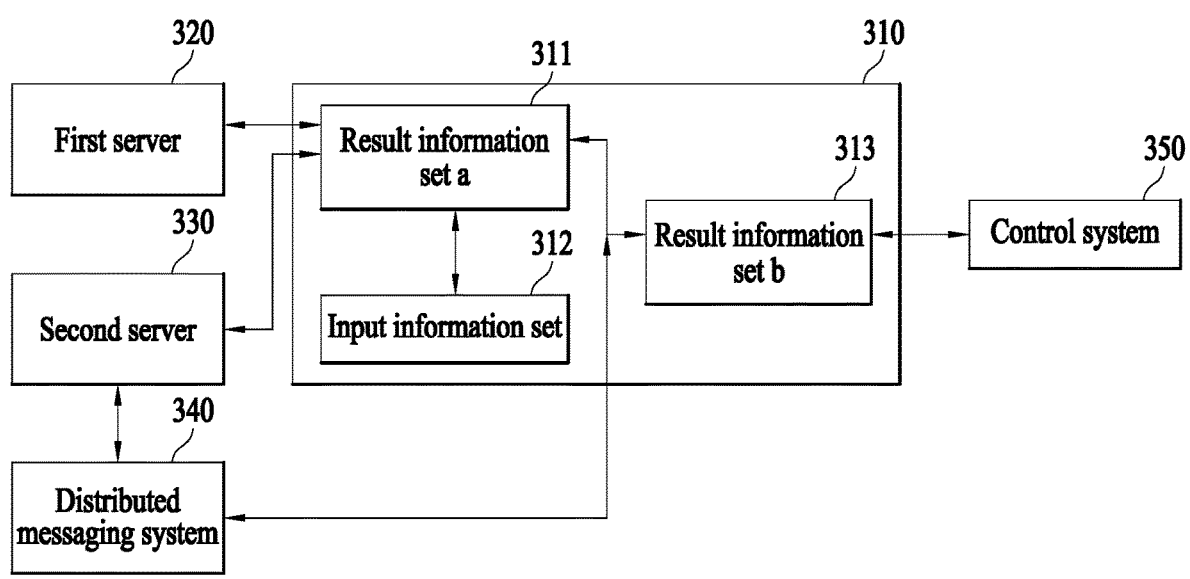
FIG. 3 is an exemplary diagram for describing a process of providing information according to various example embodiments of the present disclosure.

FIG. 3 is a diagram illustrating a process of providing information according to various example embodiments of the present disclosure.

Referring to FIG. 3, a computing device 310 (for example, the computing device 110 in FIG. 1) may perform a function according to the method of providing information based on the result value expected through the test. For example, the computing device 310 may receive a result information set a 311 (for example, a first result information set and a second result information set), and provide a result information set b 313 (for example, a third result information set).

The computing device 310 may receive a first result information set and a second result information set corresponding to an input information set 312 from a first server 320 (for example, the first server 120 in FIG. 1) and a second server 330 (for example, the second server 130 in FIG. 1). Referring to FIG. 3, the result information set a 311 is received from the first server 320 and the second server 330 to the computing device 310, but the result information sets received from the first server 320 and the second server 330 which are individual servers may have different output values. For example, the first result information set that the computing device 310 receives from the first server 320 may be included in the result information set a 311. As another example, the second result information set that the computing device 310 receives from the second server 330 may be included in the result information set a 311. As another example, the computing device 310 may receive at least a part (for example, the first result information set) of the result information set a 311 by applying the reference code from the first server 320 to the same input information set. As another example, the computing device 310 may receive at least a part (for example, the second result information set) of the result information set a 311 by applying the development code from the second server 330 to the same input information set as the input information set in the first server 320. Referring to FIG. 3, the result information set a 311 may be received from the first server 320 and the second server 330. The input information set 312 is not shown to be transmitted to the first server 320 and the second server 330 in FIG. 3, but the input information set 312 may be transmitted or provided to the first server by a direct and/or indirect method. The input information set 312 may be stored in a database of at least one administrator and transmitted through a wired and/or wireless network environment. The input information set 312 may be transmitted to the computing device 310, the first server 320, and/or the second server 330 by the distributed messaging system.

The computing device 310 may store input values of cases where a problem occurred and an information set of the desired result values for the input values in the database (for example, the database 113 in FIG. 2) or receive the input values and the information set by the direct and/or indirect method. The computing device 310 may test the cases on a work code to be distributed before distributing the work code (for example, a service code and a distribution code) to the service server (for example, the first server) based on the built database. The computing device 310 may monitor whether an output value corresponding to the distributed work code indicates the same result as the result information set of the database or indicates another result with a difference. The desired result value may be the output value corresponding to the input information set by applying the reference code to the input information set in the service server. For example, the input information set 312 input to the service server and the test server may be the same thing. The computing device 310 may provide the difference (for example, the difference in the result information set a 311, the difference between the first result information set and the second result information set, or the difference in the output values by code for the same input information set) between the result information sets in the service server and the test server for the same input information set 312 as the result information set b 313 (for example, a third result information set). For example, the computing device 310 may provide, as the result information set b 313, the difference between the first result information set and the second result information set that may be included in the result information set a 311.

Referring to FIG. 3, the first server 320 may include a server on which the reference code runs, and the second server 330 may include a test server or a server on which the development code runs. The first server 320 and the second server 330 may transmit the result information set a 311 (for example, the first result information set and the second result information set) corresponding to the input information set 312 to the computing device 310.

Referring to FIG. 3, the second server 330 may include a server that stores and processes information related to an operation to check an expected result value through the computing device 310. For example, the second server 330 may include the test server or the server on which development code runs. The second server 330 may transmit a deployment message to a distributed messaging system 340 (for example, the distributed messaging system 140 in FIG. 1). For example, the second server 330 may transmit the deployment message to the distributed messaging system 340 (for example, Kafka) that may utilize a distributed message queue. The deployment message transmitted to the distributed messaging system 340 is shown as the second server 330 in FIG. 3 but is transmitted through the computing device 310, the first server 320, and/or a control system 350.

Referring to FIG. 3, the distributed messaging system 340 may not have a structure that stores data in a memory or a database. For example, a producer may transmit data to the distributed messaging system 340, and a consumer may receive data stored in the distributed messaging system 340. The distributed messaging system 340 may provide and interoperate with APIs for the producer and the consumer. The distributed messaging system 340 may include at least one server and transmit data of another server when a predetermined number of consumers receive data without waiting for all data to be transmitted from one server. For example, upon receiving the deployment message, the distributed messaging system 340 may distribute and transmit the message queue that triggers the performance of the method of providing information by the computing device

310. For example, the distributed messaging system 340 may transmit the input information set 312 to the computing device 310. As another example, the distributed messaging system 340 may transmit the input information set 312 to the computing device 310, the first server 320, and/or the second server 330.

Referring to FIG. 3, the control system 350 may transmit data to the computing device 310, the first server 320, the second server 330, and/or the distributed messaging system 340. For example, the control system 350 may change data according to the change in the development code of the administrator, the changes in data stored in the first server 320, or changes in data stored in the second server 330. The control system 350 may transmit data including an input information set related to performing the method of providing information by the computing device 310. The control system 350 may receive the result information set b (for example, the third result information set) from the computing device 310 through the web UI.

Figure 4:
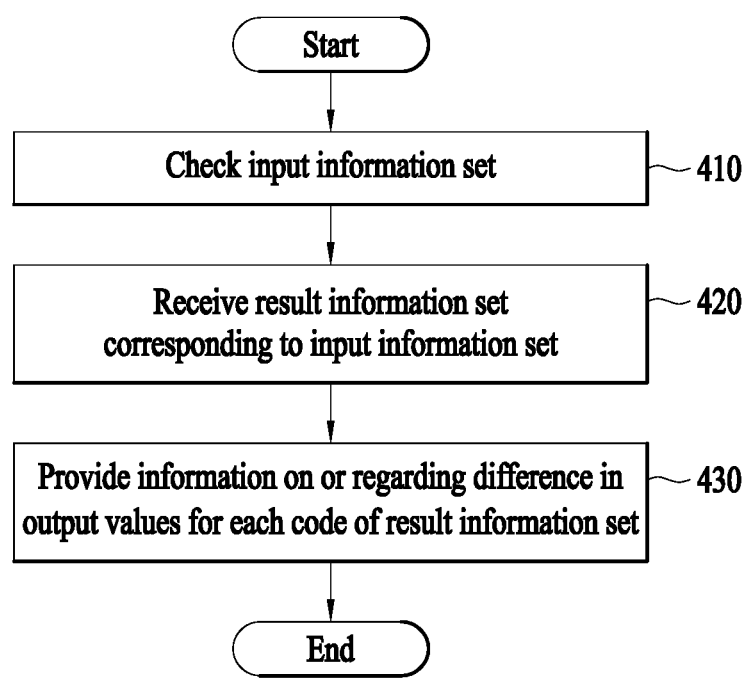
FIG. 4 is a schematic flowchart of a method of providing information according to various example embodiments of the present disclosure.

FIG. 4 is a schematic flowchart of a method of providing information according to various example embodiments of the present disclosure.

Referring to FIG. 4, a processor (for example, the processor 111 in FIG. 2) may check the input information set (for example, the input information set 312 in FIG. 3) in operation 410. For example, the input information set may be transmitted to a computing device (for example, the computing device 110 in FIG. 1 and the computing device 310 in FIG. 3) through a control system (for example, the control system 350 in FIG. 3). As another example, the input information set may be transmitted to the first server (for example, the first server 120 in FIG. 1 and the first server 320 in FIG. 3) and/or the second server (for example, the second server 130 in FIG. 1 and the second server 330 in FIG. 3) through the control system. As another example, the input information set may be transmitted to the computing device, the first server, and/or the second server through the distributed messaging system. The input information set may be a set of input values for performing the test through the computing device.

Referring to FIG. 4, the processor may receive a result information set corresponding to the input information set in operation 420. The first server may apply the reference code to derive the first result information set (for example, the result information set a 311 in FIG. 3) corresponding to the input information set and transmit the derived first result information set to the computing device. The second server may apply the development code to derive the second result information set (for example, the result information set a 311 in FIG. 3) corresponding to the input information set and transmit the derived second result information set to the computing device.

Referring to FIG. 4, in operation 430, the processor may provide the information on or regarding the difference in the output values for each code of the result information sets. The difference in the output values for each code of the result information sets may be the difference in the output values for each code of the first result information set and the second result information set. In response to individual codes applied to the input information set, the result information set may have the same output value for each code, and the first result information set and the second result information set may have the same or different output values for each individual code. The difference in the output values for each code of the result information sets may be the third result information set (for example, the result information set b 313 in FIG. 3).

Figure 5:
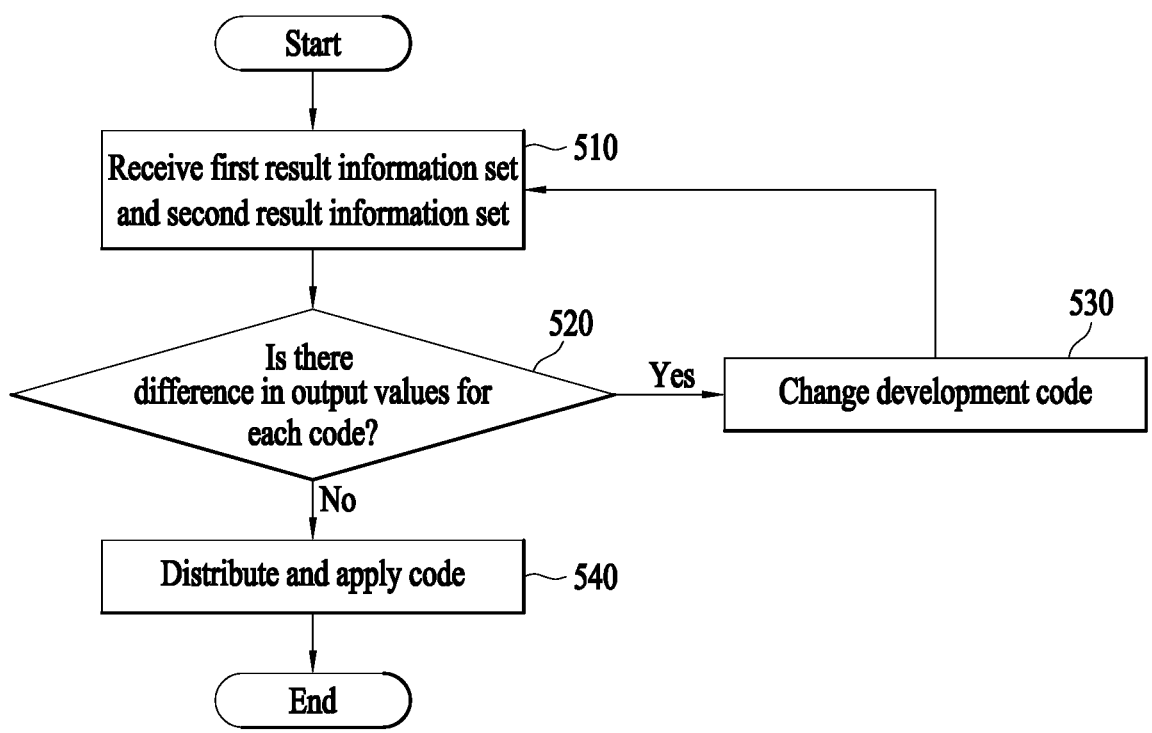
FIG. 5 is a flowchart illustrating a method of providing information by a computing device according to an example embodiment of the present disclosure.

FIG. 5 is a flowchart illustrating a method of providing information by a computing device according to the example embodiment of the present disclosure.

Referring to FIG. 5, a processor (for example, the processor 111 in FIG. 2) may receive the first result information set and the second result information set (for example, the result information set a 311 in FIG. 3) in operation 510. For example, the processor may receive the first result information set corresponding to the input information set from the first server and the second result information set corresponding to the input information set from the second server.

Referring to FIG. 5, in operation 520, the processor may determine whether there is a difference in the output values for each code of the first result information set and the second result information set. For example, the processor may determine the difference between the first result information set and the second information set as the difference in the output values for each code of the input information set. The processor may determine the existence of the difference in the output values for each code and determine a code that may cause an error when the difference exceeds a predetermined number.

Referring to FIG. 5, the processor may proceed to operation 530 when the difference in output values for each code exceeds a predetermined number in operation 520. The development code may be changed based on the third result information set provided by the administrator. The processor may acquire the changed development code in operation 530. For example, the processor may acquire the changed development code based on the information on or regarding the difference included in the third result information set. When the difference in the output values determined for each code is greater than a predetermined number, it may be necessary to change the corresponding code. The processor may receive the changed second result information set by changing the development code to be applied to the input information set in the second server. The development code may be changed by the administrator. The reference code and the development code, which are codes to be applied to the first server and the second server, respectively, may be stored in a database of individual servers. The reference code and the development code may be transmitted to the first server and the second server through the computing device or transmitted to the first server and the second server through the control system or the administrator tool. The changed development code may be transmitted to the second server via the computing device through the control system or the administrator tool or directly transmitted to the second server. The processor may provide the third result information set including the information on or regarding the difference between the first result information set and the second result information set corresponding to the changed development code. For example, when the difference in the output values for each code of the third result information set newly provided in response to the changed development code is less than a predetermined number, the processor may proceed to operation 540.

Referring to FIG. 5, the processor may proceed to operation 540 when the difference in the output values for each code is less than a predetermined number in operation 520. The processor may provide the third result information set including the information on the difference between the first result information set and the second result information set. The processor may distribute the development code to the service server in operation 540 when the difference in the output values for each code is less than a predetermined number based on the received third result information set.

The service server may apply the development code. The processor may determine whether to distribute and apply the development code based on the third result information set including the difference in the output values for each code of the first result information set and the second result information set. The processor may determine that the service server may operate without errors when the information on the difference is less than a predetermined number. For example, the processor may determine that the reference code may operate without errors even in the service server when the difference in the output values for each code of the result (for example, the first result information set) of applying the reference code to the input information set in the first server and the result (for example, the second result information set) of applying the development code to the input information set in the second server is less than a predetermined number. A certain number for the number of differences that serves as a reference for determining whether or not errors occur in codes may be set by the administrator and may be different for each code.

Figure 6:
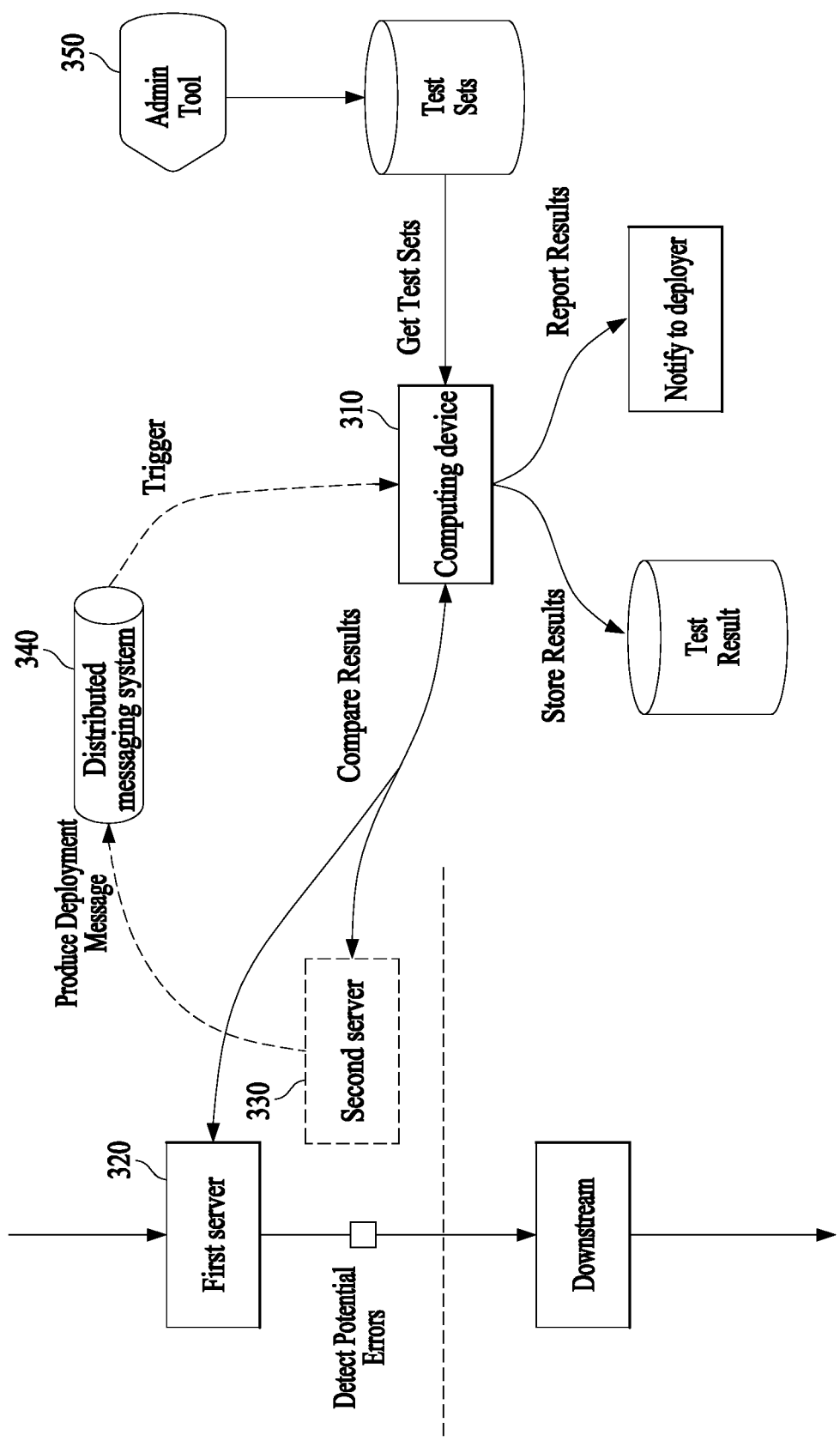
FIG. 6 is an exemplary diagram illustrating an information providing performed between a computing device and a peripheral device according to various example embodiments of the present disclosure.

FIG. 6 is a diagram illustrating an information providing method performed between a computing device and a peripheral device according to various example embodiments of the present disclosure.

Referring to FIG. 6, the computing device 310 (for example, the computing device 110 in FIG. 1) may receive the input information set from the control system 350 (for example, a program through the administrator tool). As another example, the input information set may be an input value for performing a test providing the third result information set. The computing device 310 may determine whether the difference between the test result value and the expected result value is within an error range by performing the test on the development code before distributing and applying the development code to the service server.

Referring to FIG. 6, the control system 350 may transmit the test set to the computing device. The test set may be the input information set. The first server 320 and the second server 330 may receive the input information set from the computing device 310 or the control system 350. The first server 320 may transmit the first result information set corresponding to the received input information set to the computing device 310. The second server 330 may transmit the second result information set corresponding to the received input information set to the computing device 310. The first result information set may include the output values for each code corresponding to the input information set to be tested through the computing device 310. The second result information set may include the output values for each code corresponding to the input information set to be tested through the computing device 310.

Referring to FIG. 6, the second server 330 may transmit a deployment message to the distributed messaging system 340. The distributed messaging system 340 may transmit a request message for performing the method of providing information by the computing device 310 based on the received deployment message. Although not illustrated in FIG. 6, the computing device 310 may transmit a request message for providing the third result information set through the distributed messaging system 340. The request message may be for receiving the first result information set and the second result information set from the first server 320 and the second server 330, or may be for starting the test.

Referring to FIG. 6, the computing device 310 may receive the first result information set and the second result information set from the first server 320 and the second server 330. The computing device 310 may compare the difference in the output values for each code of the first result information set and the second result information set. The computing device 310 may provide the control system 350 with the third result information set including the information on or regarding the difference in the output values for each code of the first result information set and the second result information set. The computing device 310 may store the third result information set in the database. The information on the difference may include the information on or regarding the number of differences in the output values for each code. The number of differences may be counted by the computing device 310.

Figure 7:
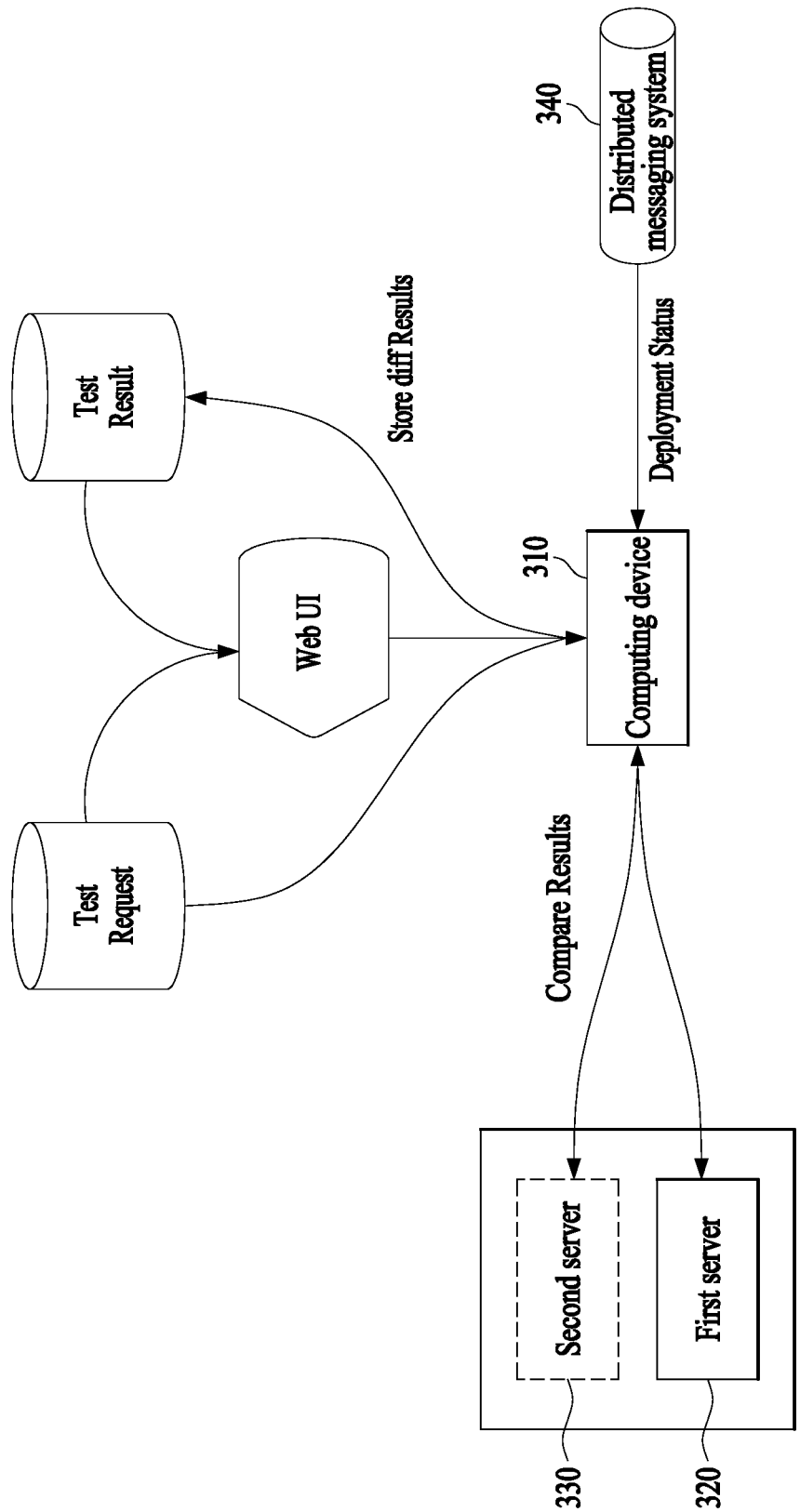
FIG. 7 is an exemplary diagram illustrating an information providing performed between a computing device and a peripheral device according to various example embodiments of the present disclosure.

FIG. 7 is a diagram illustrating an information providing method performed between a computing device and a peripheral device according to various example embodiments of the present disclosure.

Referring to FIG. 7, the computing device 310 (for example, the computing device 110 in FIG. 1) may receive the first result information set and the second result information set from the first server 320 (for example, the first server 120 in FIG. 1) and the second server 330 (for example, the second server 130 in FIG. 1). The computing device 310 may receive a message triggering the performance of the method of providing information from the distributed messaging system 340 (for example, the distributed messaging system 140 in FIG. 1).

Referring to FIG. 7, the computing device 310 may provide the third result information set including the information on or regarding the difference between the first result information set and the second result information set. The third result information set may be accumulated as test results and stored in a database. The control system and/or the administrator may receive the test result through the web UI. The third result information set may include information to be displayed on the web UI, configuration information that configures a comparison target portion, and the like, and may also include the web UI.

Figure 8:
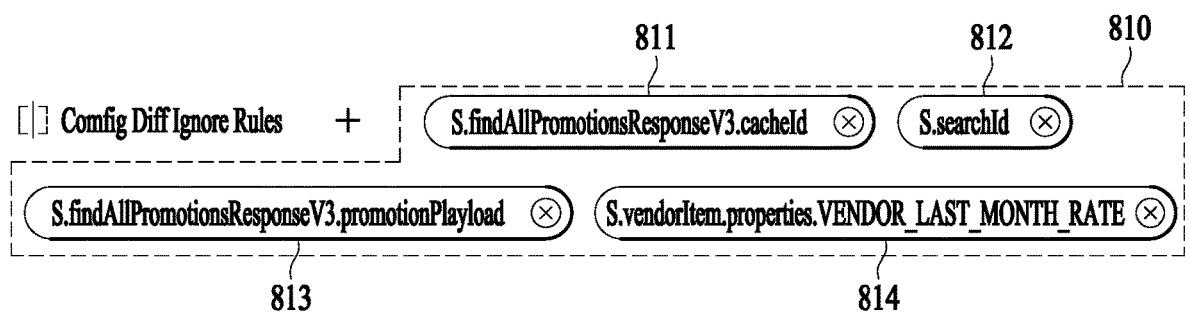
FIG. 8 is an exemplary diagram of rule application of a method of providing information according to various example embodiments of the present disclosure.

FIG. 8 is an exemplary diagram related to rule application of a method of providing information according to various example embodiments of the present disclosure.

Referring to FIG. 8, configuration information 810 (for example, an ignorance rule) may be input to the control system (for example, the control system 350 in FIG. 3) and transmitted to the computing device (for example, the computing device 110 in FIG. 1 and the computing device 310 in FIG. 3). The processor (for example, the processor 111 in FIG. 2) may acquire the configuration information that excludes the portion in which the third result information set is changed from the information on the difference, regardless of the change in the development code. For example, the processor may acquire configuration information that configures a comparison target portion of the first result information set and the second result information set. The third result information set may be displayed based on the configuration information. The configuration information may be applied to exclude, from the information on the difference, the portion of the output values included in the first result information set and the second result information set that is changed regardless of the change in the development code. The administrator may input the configuration information to exclude the portion changed regardless of the change in the development code from the information on the difference included in the third result information set. For example, the processor may receive the configuration information through the program by the control system and/or the administrator tool, or acquire the configuration information from the database (for example, the database 113 in FIG. 2).

The processor may determine whether the difference in the output values for each code of the first result information set and the second result information set exceeds a predetermined number. The processor counts the difference in the output values for each individual code by number in a preset rule and may determine that there is no problem in the code when the difference is less than a predetermined number. For example, the processor may determine that there is no difference in the first code when the difference in the output values for the first code of the first result information set and the second result information set is less than 10 (a predetermined number of differences between the output values for the first code is 10) as the test result. The first code is only an example, and a predetermined number of n-th codes may exist individually.

Referring to FIG. 8, there may be configuration information 811 applied to a cache of products related to promotion, configuration information 812 applied to products that are searched for in advance, configuration information 813 applied to a payload of products related to promotion, configuration information 814 applied to results related to the last month of sales of a vendor, and the like. The configuration information applied to the difference in the output values for each code of the result information set (for example, the second result information set) including the output values output by applying the development code and the result information set (for example, the first result information set) including the output values output by applying the reference code is not limited to the example illustrated in FIG. 8.

Figure 9:
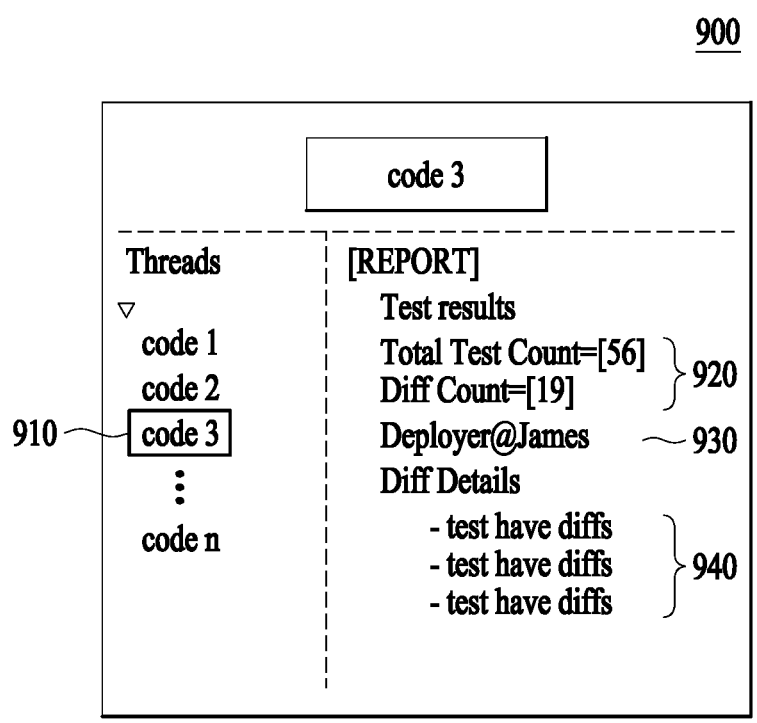
FIG. 9 is an exemplary diagram of a third result information set including information on or regarding a difference in output values for each code according to various example embodiments of the present disclosure.

FIG. 9 is an exemplary diagram related to a third result information set including information on or regarding a difference in output values for each code according to various example embodiments of the present disclosure.

Referring to FIG. 9, an administrator may check a difference between result information sets corresponding to a third code 910 (for example, code 3) of the input information set. For example, the administrator may check the difference in the output values between the first result information set and the second result information set corresponding to the third code 910 by a test count and difference count 920. A processor may count the test count and difference count 920 and provide the third result information set including the information illustrated in FIG. 9.

Referring to FIG. 9, the administrator may check an administrator name 930 that configures the third code 910 through the provided third result information set. The administrator may check an item 940 in which the difference in the output values of the third code 910 is displayed in detailed item information (Diff Detail) on the difference.

Referring to FIG. 9, the processor may provide the third result information set that includes the information on or regarding whether there is a difference in the output values for the first code to the n-th code. For example, FIG. 9 illustrates an example of providing, when there is an input selecting the third code 910 for checking a difference in output values existing in the third code 910, the third result information set including the information in which the difference in output values for each selected third code 910 exists. Reference numerals 920 to 940 illustrated in FIG. 9 may indicate the third result information set including the information on or regarding the third code 910. In FIG. 9, an example of the third code 910 is illustrated as 900, but this example is not limited to the third code 910 and may be extended to the first to the n-th code and described without any limitation.

Referring to FIG. 9, the illustrated information may be comparison information. The processor may receive the selection input for checking the difference in the output values that exist for each code and provide comparison information on or regarding a difference between portions selected in response to the selection input among the output values of the code to the first result information set and the second result information set, and the comparison information may include information indicating at least a part of the first result information set, at least a part of the second result information set, and a portion in which the difference exists. The selection input may be input by the administrator, and the processor may receive the selection input.

FIG. 10 is an exemplary diagram of a third result information set including information on or regarding a web UI that displays information on or regarding a code according to various example embodiments of the present disclosure.

Referring to FIG. 10, some pieces of the information that may be included in the third result information set is illustrated, which may be confirmed on an example screen for a web UI. For example, a code name 1020 may include names of codes that may be included in the input information set. A code 1 1021 may be a first code, a code 2 1022 may be a second code, and a code 3 1023 may be a third code. A square mark on the left of the code name 1020 may indicate a selection window 1010 for an individual code. For example, a square mark on the left of the code 1 1021 may be a selection window 1011 for the code 1, a square mark on the left of the code 2 1022 may be a selection window 1012 for the code 2, and a square mark on the left of the code 3 1023 may be a selection window 1013 for the code 3.

Referring to FIG. 10, a code description 1030 may be a space for describing a function of individual codes. For example, a description 1 1031 may be a description of a function for the code 1 1021, a description 2 1032 may be a description of a function for the code 2 1022, and a description 3 1033 may be a description of the code 3 1023. An administrator name 1040 may be a name of an administrator who configures individual codes. For example, an administrator 1 1041 may be a name of an administrator who configures the code 1 1021, an administrator 2 1042 may be a name of an administrator who configures the code 2 1022, and an administrator 3 1043 may be a name of an administrator who configures code 3 1023.

Referring to FIG. 10, the web UI that may be checked by the program by the control system and/or the administrator tool displays the third result information set to be visually checked and may be provided by being included in the third result information set. FIG. 10 illustrates three codes, but the number of codes may not be limited thereto.

According to various example embodiments, a method of providing information by a computing device may include checking an input information set, receiving a first result information set corresponding to the input information set from a first server, receiving a second result information set corresponding to the input information set from a second server, and providing a third result information set including information on or regarding a difference between the first result information set and the second result information set.

In the method, the first server may be a server on which a reference code runs, the second server may be a server on which a development code runs, the development code may include a code corresponding to the reference code, and the reference code may correspond to a code of a service server provided to a user.

In the method, the providing of the third result information set may include providing the third result information set including information on or regarding whether there is a difference in output values for each code running on the first server and the second server.

The method may include receiving a selection input for checking the difference in the output values for each code, in which the providing of the third result information set may include providing comparison information on or regarding a difference between portions selected in response to the selection input among the output values for each code based on the first result information set and the second result information set, and the comparison information may include information indicating at least a part of the first result information set, at least a part of the second result information set, and a portion where the difference exists.

In the method, the third result information set may include information on or regarding a web UI on which names of the codes running on the first server and the second server, a description of the codes, and a name of an administrator who configures the codes are displayed.

In the method, the development code may be changed to correspond to the provided third result information set, and the method may further include providing the third result information set corresponding to the changed development code.

In the method, the third result information set corresponding to the changed development code may include information on or regarding the difference between the first result information set and the second result information set changed to correspond to the input information set according to the changed development code.

The method may further include acquiring configuration information that configures a comparison target part of the first result information set and the second result information set, in which the third result information set may be displayed based on the configuration information.

The method may further include transmitting a request message for providing the third result information set through a distributed messaging system, in which the first result information set and the second result information set may be received in response to the request message.

The method may further include acquiring selection information that selects at least a part of the input information set, in which the input information set may be checked based on the selection information.

According to various example embodiments, a computing device may include a transceiver for receiving and transmitting data, a database for storing data, and a processor, in which the processor may check an input information set received through the transceiver, receive a first result information set corresponding to the input information set from a first server, receive a second result information set corresponding to the input information set from a second server, and provide a third result information set including information on or regarding a difference between the first result information set and the second result information set.

In the computing device, the first server may be a server on which a reference code runs, the second server may be a server on which a development code runs, the development code may include a code corresponding to the reference code, and the reference code may correspond to a code of a service server provided to a user.

In the computing device, the processor may provide the third result information set that includes information on or regarding whether there is a difference between output values for each code running on the first server and the second server.

In the computing device, the processor may receive a selection input for checking the difference in the output values for each code, and provide comparison information on or regarding a difference between portions selected in response to the selection input among the output values for each code based on the first result information set and the second result information set, and the comparison information may include information indicating at least a part of the first result information set, at least a part of the second result information set, and a portion where the difference exists.

In the computing device, the third result information set may include information on or regarding a web UI on which names of the codes running on the first server and the second server, a description of the codes, and a name of an administrator who configures the codes are displayed.

In the computing device, the development code may be changed to correspond to the provided third result information set, and the processor may provide a third result information set corresponding to the changed development code.

In the computing device, the third result information set corresponding to the changed development code may include information on or regarding a difference between the first result information set and the second result information set changed to correspond to the input information set according to the changed development code.

In the computing device, the processor may acquire configuration information that configures a comparison target portion of the first result information set and the second result information set, and the third result information set may be displayed based on the configuration information.

In the computing device, the processor may transmit a request message for providing the third result information set through a distributed messaging system, and receive the first result information set and the second result information set in response to the request message.

In the computing device, the processor may acquire selection information that selects at least a part of the input information set, and the input information set may be checked based on the selection information.

Meanwhile, the example embodiments of the present disclosure have been disclosed in the present specification and drawings, and although specific terms are used, they are merely used in a general sense to easily describe the technical content of the present disclosure and to aid understanding of the present disclosure, and are not intended to limit the scope of the present disclosure. It is obvious to those of ordinary skill in the art to which the present disclosure pertains that other modifications based on the technical idea of the present disclosure can be implemented in addition to the example embodiments disclosed herein.

The electronic apparatus or terminal according to the above-described example embodiments may include a processor, a memory that stores and executes program data, a permanent storage such as a disk drive, a communication port that communicates with an external device, a touch panel, a key, a UI device such as a button, and the like. Methods implemented as software modules or algorithms may be stored on a computer-readable recording medium as computer-readable codes or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a compact disk (CD)-ROM or a digital versatile disc (DVD)), and the like. The computer-readable recording medium may be distributed in computer systems connected to each other through a network, and as a result, the computer-readable codes may be stored and executed in a distributed scheme. The medium may be readable by a computer, stored in a memory, and executed on a processor.

The present example embodiment may be represented by functional block configurations and various processing operations. These functional blocks may be implemented by various numbers of hardware and/or software components that execute specific functions. For example, the example embodiment may employ integrated circuit configurations, such as a memory, processing, logic, and a look-up table, capable of executing various functions by control of one or more microprocessors or other control devices. Similar to executing the components in software programming or software elements, the present example embodiment can be implemented in programming or scripting languages such as python, C, C++, Java, and assembler, including various algorithms implemented by a combination of data structures, processes, routines or other programming configurations. Functional aspects may be implemented in algorithms executed on one or more processors. In addition, the present example embodiment may employ a conventional technology for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described example embodiments are merely exemplary, and other example embodiments may be implemented within the scope of the following claims.

What is claimed is:

1. A method operable by a computing device for automating installation of a program on a production server, the method comprising:
checking an input data set related to a first program running on the production server;
identifying a portion of a source code of the first program, the identified portion corresponding to the input data set;
receiving, from a first server, a first result data set corresponding to an output of a reference program executed on the first server based on the input data set, the reference program corresponding to the first program;
receiving, from a second server, a second result data set corresponding to an output of a development program executed on the second server based on the input data set, wherein the development program is different from the reference program;
determining a third result data set including information regarding a difference between the first result data set and the second result data set, wherein the difference is unrelated to a difference between the reference program and the development program; and
based at least on a received instruction, from a control server, automatically causing a second program to be installed on the production server,
wherein the determining of the third result data set comprises providing the third result data set including information regarding whether a difference in output values for each program running on the first server and the second server exists.

2. The method of claim 1, further comprising:
receiving a selection input for checking the difference in the output values for each program,
wherein the determining of the third result data set comprises providing comparison data regarding a difference between portions selected in response to the selection input among the output values for each program based on the first result data set and the second result data set, and
wherein the comparison data includes information indicating at least a part of the first result data set, at least a part of the second result data set, and a portion where the difference between the portions exists.

3. The method of claim 1, wherein the third result data set includes information regarding a web user interface (UI) on which names of the programs running on the first server and the second server, a description of the programs, and a name of an administrator who configures the programs are displayed.

4. The method of claim 1, wherein the development program is changed to correspond to the determined third result data set, and
the method further comprises providing the third result data set corresponding to the changed development program.

5. The method of claim 4, wherein the third result data set corresponding to the changed development program includes information regarding the difference between the first result data set and the second result data set changed to correspond to the input data set according to the changed development program.

6. The method of claim 4, further comprising:
acquiring configuration information that configures a comparison target part of the first result data set and the second result data set,
wherein the third result data set is displayed based on the configuration information.

7. The method of claim 1, further comprising:
transmitting a request message for providing the third result data set through a distributed messaging system,
wherein the first result data set and the second result data set are received in response to the request message.

8. The method of claim 1, further comprising:
acquiring selection information that selects at least a part of the input data set,
wherein the input data set is checked based on the selection information.

9. A computing device operating a method for automating installation of a program on a production server, the computing device comprising:
a transceiver configured to receive and transmit data;
a database in which data is stored; and
a processor,
wherein the processor is configured to:
check an input data set related to a first program running on the production server, received through the transceiver;
identify a portion of a source code of the first program, the identified portion corresponding to the input data set;
receive a first result data set corresponding to an output of a reference program executed on the first server based on the input data set from a first server;
receive a second result data set corresponding to an output of a development program executed on the second server based on the input data set from a second server, wherein the development program is different from the reference program;

determine a third result data set including information regarding a difference between the first result data set and the second result data set, wherein the difference is unrelated to a difference between the reference program and the development program; and based at least on a received instruction, from a control server, automatically cause a second program to be installed on the production server, wherein the processor is further configured to determine the third result data set that includes information regarding whether there is a difference between output values for each program running on the first server and the second server.

10. The computing device of claim 9, wherein the processor is configured to:

receive a selection input for checking the difference in the output values for each program; and determine comparison data regarding a difference between portions selected in response to the selection input among the output values for each program based on the first result data set and the second result data set, wherein the comparison data includes information indicating at least a part of the first result data set, at least a part of the second result data set, and a portion where the difference between the portions exists.

11. The computing device of claim 9, wherein the third result data set includes information regarding a web user interface (UI) on which names of the programs running on the first server and the second server, a description of the programs, and a name of an administrator who configures the programs are displayed.

12. The computing device of claim 9, wherein the development program is changed to correspond to the determined third result data set, and the processor is configured to provide the third result data set corresponding to the changed development data.

13. The computing device of claim 12, wherein the third result data set corresponding to the changed development program includes information regarding the difference between the first result data set and the second result data set changed to correspond to the input data set according to the changed development program.

14. The computing device of claim 12, wherein the processor is configured to acquire configuration information that configures a comparison target portion of the first result data set and the second result data set, and the third result data set is displayed based on the configuration information.

15. The computing device of claim 9, wherein the processor is configured to:

transmit a request message for providing the third result data set through a distributed messaging system; and receive the first result data set and the second result data set in response to the request message.

16. The computing device of claim 9, wherein the processor is configured to acquire selection information that selects at least a part of the input data set, and the input data set is checked based on the selection information.

* * * * *